US006633796B1

(12) United States Patent
Pool et al.

(10) Patent No.: US 6,633,796 B1
(45) Date of Patent: Oct. 14, 2003

(54) MEDICATION TIMING DEVICE

(76) Inventors: Dan B. Pool, 12772 E. Turquoise, Phoenix, AZ (US) 85029; David F. Kreitzer, 9049 N. Arroya Grande Dr., Phoenix, AZ (US) 85028

( * ) Notice: Subject to any disclaimer, the term of this patent is extended or adjusted under 35 U.S.C. 154(b) by 0 days.

(21) Appl. No.: 09/881,593

(22) Filed: Jun. 14, 2001

Related U.S. Application Data

(60) Provisional application No. 60/211,504, filed on Jun. 14, 2000.

(51) Int. Cl.$^7$ ................................................ G06F 17/00

(52) U.S. Cl. ......................... 700/231; 368/10; 368/244; 368/250; 221/2; 221/15

(58) Field of Search ............................ 368/10, 12, 244, 368/250, 255; 221/2, 3, 15; 700/231, 232

(56) References Cited

U.S. PATENT DOCUMENTS

| | | | | | |
|---|---|---|---|---|---|
| 4,367,955 | A | * | 1/1983 | Ballew | 215/2 |
| 4,419,016 | A | * | 12/1983 | Zoltan | 206/534 |
| 4,504,153 | A | * | 3/1985 | Schollmeyer et al. | 221/2 |
| 5,016,230 | A | * | 5/1991 | Seifers et al. | 368/10 |
| 5,233,571 | A | * | 8/1993 | Wirtschafter | 368/10 |
| 5,625,334 | A | * | 4/1997 | Compton | 116/308 |
| 5,751,661 | A | * | 5/1998 | Walters | 221/2 |
| 5,815,586 | A | * | 9/1998 | Dobbins | 215/273 |
| 5,852,590 | A | * | 12/1998 | de la Huerga | 368/10 |
| 5,953,288 | A | * | 9/1999 | Chappell | 215/230 |
| 6,018,289 | A | * | 1/2000 | Sekura et al. | 221/15 |
| 6,158,613 | A | * | 12/2000 | Novosel et al. | 221/3 |
| 6,317,390 | B1 | * | 11/2001 | Cardoza | 221/2 |
| 6,324,123 | B1 | * | 11/2001 | Durso | 221/15 |
| 6,335,907 | B1 | * | 1/2002 | Momich et al. | 221/15 |
| 6,424,599 | B1 | * | 7/2002 | Ditzig | 368/10 |

* cited by examiner

*Primary Examiner*—Christopher P. Ellis
*Assistant Examiner*—Richard Ridley
(74) *Attorney, Agent, or Firm*—Parsons & Goltry; Robert A. Parsons; Michael W. Goltry

(57) ABSTRACT

A medication timing device including a base carrying a circuit with a timing device, a switch for activating the timing device, a signal device activated by the timing device, and a battery coupled to the timing device and the signal device, and a top coupled to the base and covering the circuit. The top is moveable between a normal expanded position and a compressed position in which the switch is tripped. A fastening element fastens the base to a medication container.

18 Claims, 5 Drawing Sheets

MEDICATION TIMING DEVICE

CROSS-REFERENCE TO RELATED APPLICATION

This application claims the benefit of U.S. Provisional Application entitled MEDICATION TIMING DEVICE, serial No. 60/211,504, filed Jun. 14, 2000.

FIELD OF THE INVENTION

This invention- relates to the health care industry.

More particularly, the present invention relates to timing devices.

In a further and more specific aspect, the instant invention concerns timing devices for signaling medication consumption.

BACKGROUND OF THE INVENTION

As medical technology advances and the pharmaceutical industry develop more medications, individuals in society continue to use more medication. As medications increase in effectiveness and expand in treatment, more and more individuals use more medication. This is particularly true with the elderly. The average age of people is increasing, partly due to developments in medications. Many elderly people take multiple medications at various intervals throughout the day. When one type of medication is used, it is often difficult to remember to take it on time and consistently. When multiple medications are involved, doses can be missed. Often this can have detrimental consequences.

There are many timing devices available today. Many are computerized to allow programming of times, types and quantities of medications. Often they will signal the individual when a medication is required. While these devices provide good warnings, and are very programmable, they often must be carried at all times, are often bulky, and are very difficult to use and program.

While medication is primarily discussed here, it should be noted that these same problems occur with reference to dietary supplements, such as vitamins, minerals and herbs.

It would be highly advantageous, therefore, to remedy the foregoing and other deficiencies inherent in the prior art.

Accordingly, it is an object of the present invention to provide a new and improved medication timing device.

Another object of the invention is to provide a medication timing device which is present with the medication at all times.

And another object of the invention is to provide a medication timing device which is simple and easy to use.

Still another object of the present invention is to provide a medication timing device which is inexpensive.

SUMMARY OF THE INVENTION

Briefly, to achieve the desired objects of the present invention in accordance with a preferred embodiment thereof, provided is a medication timing device including a base, a circuit, a top, and fastening means for fastening the base to a medication container. The base has a first surface and an opposing second surface, and carries the circuit. The circuit has a timing device, a switch for activating the timing device, a signal device activated by the timing device, and a battery coupled to the timing device and the signal device. The top is coupled to the first surface of the base and covers the circuit. The top is moveable between a normal expanded position and a compressed position in which the switch is tripped.

In a specific embodiment, the timing device times a single unchangeable interval of time, and actuates the signal device at the termination of the interval of time.

Also provided is a method of timing medication dosages including the steps of providing a container having a body and a cover couplable to the body. A timing device is provided including a base having a first surface and an opposing second surface, a circuit carried by the base and including a timing device and a switch for activating the timing device. A top is coupled to the first surface of the base covering the circuit. The timing device is fastened to one of a top surface of the cover of the container and a bottom surface of the body of the container. The timing device is activated for a single unchangeable interval of time and a signal is emitted upon termination of the interval of time.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENT

Figure 1:
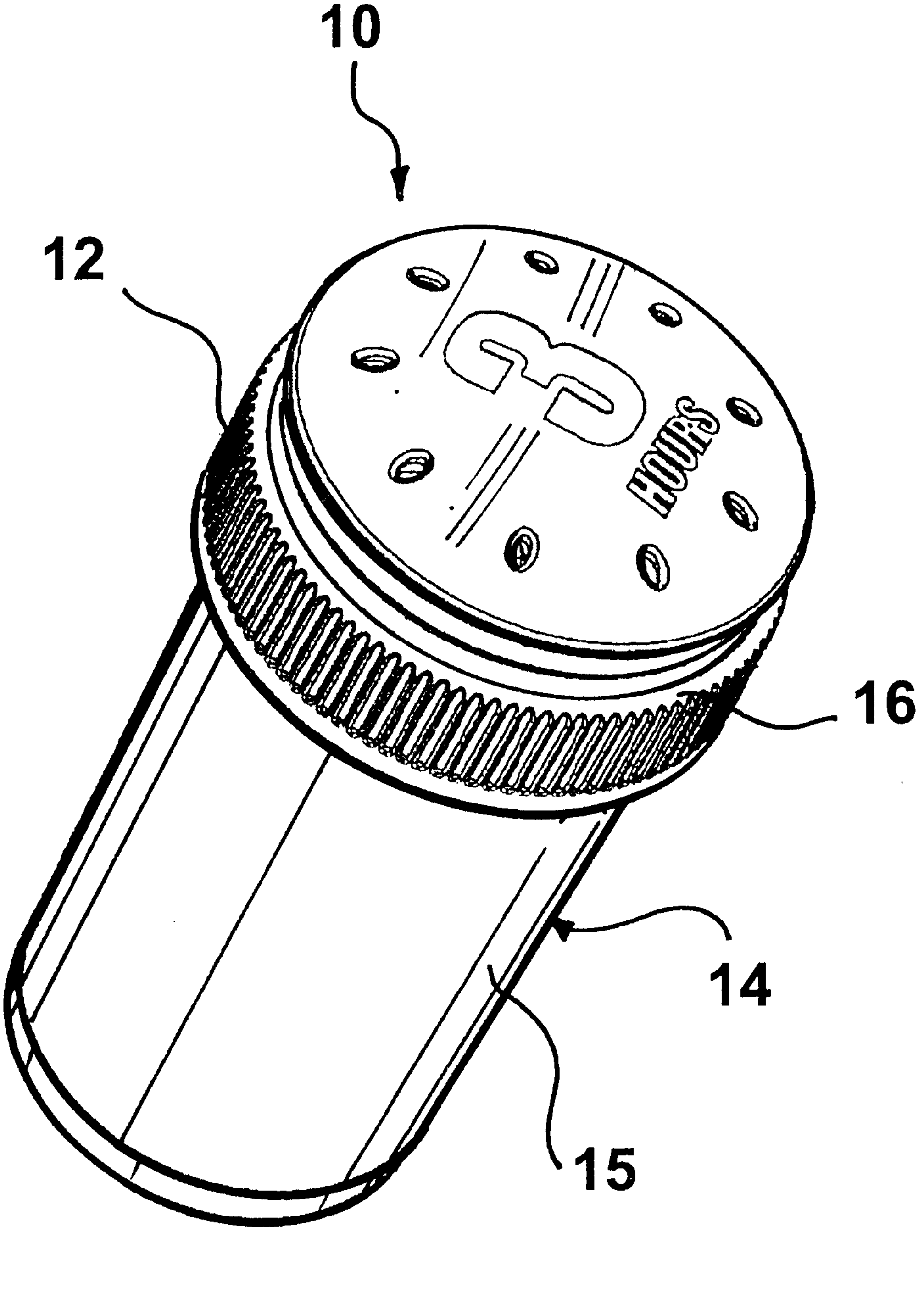
FIG. 1 is a top perspective view of a medication timing device according to the present invention as it would appear on a medication container.

Turning now to the drawings in which like reference characters indicate corresponding elements throughout the several views, attention is first directed to FIG. 1 which illustrates a medication timing device, generally designated 10, coupled to a cover 12 of a medication container 14. Cover 12 closes a body 15 of container 14. It will be understood by those skilled in the art that medication container 14 can be substantially any container used to store medication. Cover 12 is typically circular with a generally planar top surface 16. Often these caps or covers 12 include childproof features. It should also be noted that the term medication as used herein, includes drugs, vitamins, minerals, herbs, pharmaceuticals, etc.

Figure 2:
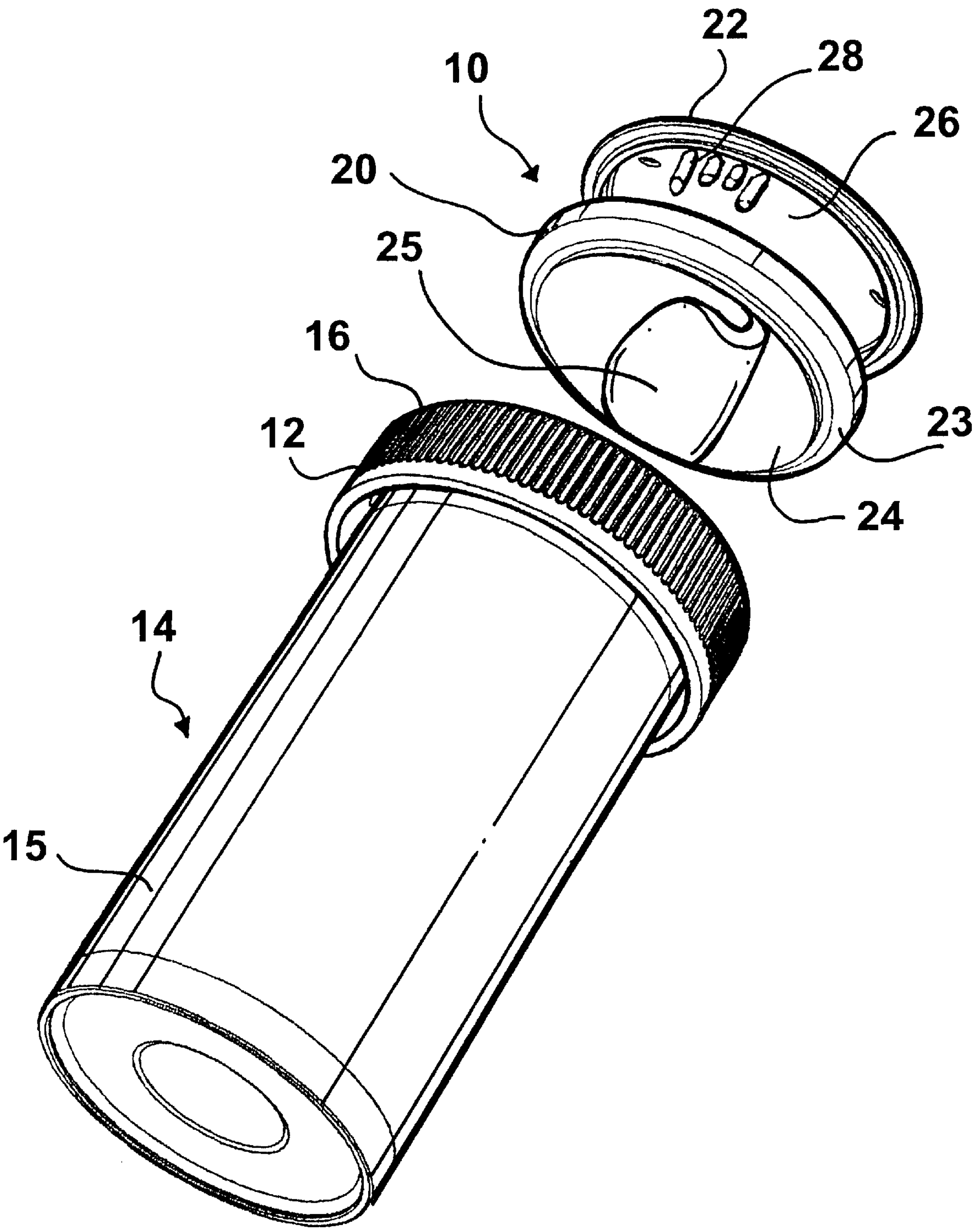
FIG. 2 is an exploded perspective view of the device of FIG. 1
Figure 3:
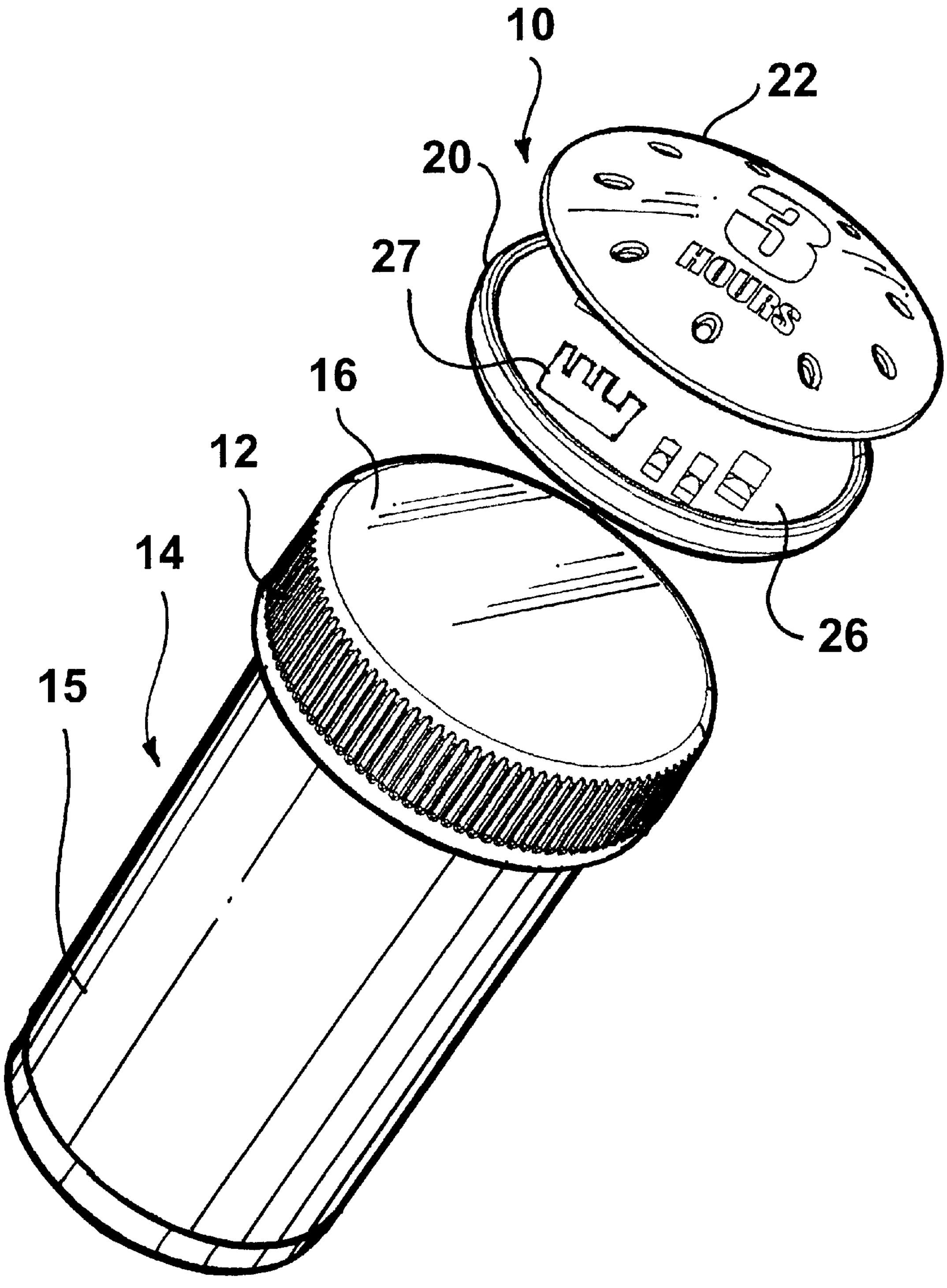
FIG. 3 is an exploded perspective view, similar t o FIG. 2, of the device of FIG. 1

With additional reference to FIGS. 2 and 3, medication timing device 10 includes a base 20 and a top 22. Base 20 is typically circular and includes a generally planar bottom surface 23 that is sized to correspond to top surface 16 of cover 12. An adhesive layer 24 is carried by bottom surface 23, adhering device 10 to cover 12. Adhesive layer 24 is protected by a removable protective sheet 25, which is removed prior to adhering device 10 to cover 12. Base 20 carries a circuit board 26 having a timing device, a start stop switch, a battery and a signal device such as a beeper. Top 22 is coupled to base 12 covering circuit board 26. Top 22 optionally includes fail safe bosses 28 extending therefrom to engage optional fail safe connections 27 on circuit board 26. Top 22 can be attached to base 20 in many different ways, such as by snap fit, friction fit, adhesives, fasteners, etc. Top 22 is formed of a flexible material so that it can be flexed toward base 20. Depressing top 22 actuates the timing element of circuit board 26. To prevent accidental actuation, a delay is included. In other words, top 22 must be depressed for a predetermined period of time to activate or trip the timer. To facilitate use, the interval of the timer is printed upon top 22.

While device 10 has been illustrated and described as being attached to cover 12, it should be understood that in an alternate embodiment, device 10 can be attached to the bottom of container 14 and function is an identical manner.

Figure 4:
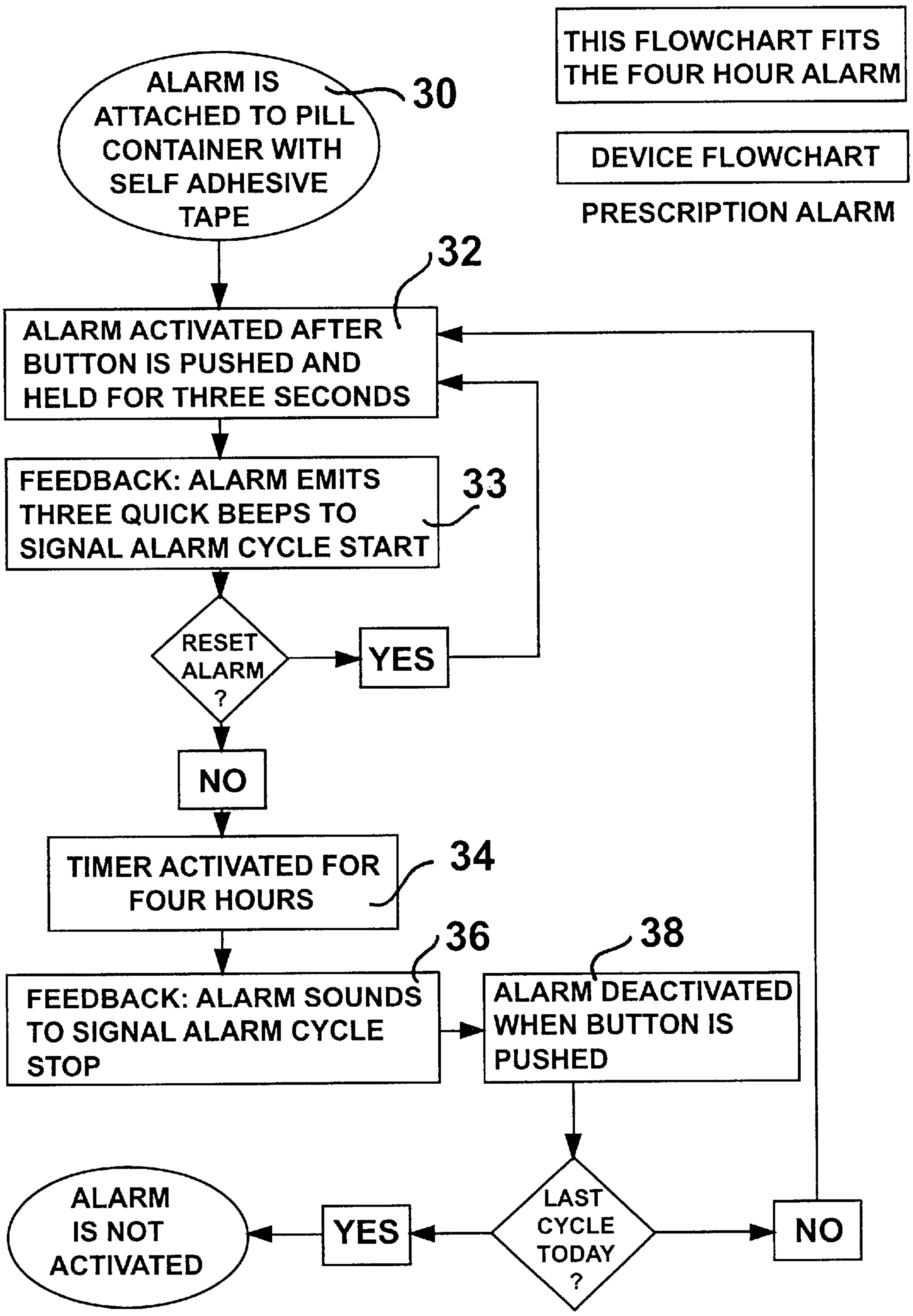
FIG. 4 is a simplified flow diagram of the operation of the medication timing device according to the present invention.

Turning now to FIG. 4, a flow diagram of the operation of medication timing device 10 is illustrated. The initial step is an attaching step 30 wherein protective sheet 25 is removed and device 10 is attached to cover 12 with adhesive layer 24. This can be performed by the individual taking the medication, or preferably, by a pharmacist when the medication is presented. In an activation step 32, an individual depresses top 22 for a given period of time, such as three seconds, to start the timer. It should be noted that until the timer is activated there is no power consumption, thereby conserving battery power. A feedback step 33 informs the user the cycle has begun. This signal can be visual, audio, etc., and is three beeps in this embodiment. Typically, device 10 is activated after the medication has been taken. Device 10 can be reset at any time by repeating steps 32 and 33. If device 10 is not reset, a timing step 34 occurs, in which the timer begins a countdown. The time interval coincides with the interval between applications of medication. In this example, a four hour period is employed. A signal step 36 includes device 10 emitting a signal to notify the individual that a medication is required. At this point, in a deactivation step 38, the individual can depress top 22 to stop the signal. The individual then knows to take the medication and reset device 10, going through steps 32 through 38 again. Once stopped, there is again no power consumption until the timer is reset. Alternatively, if it is a special occasion such as bedtime and medication is not required throughout the night, device 10 can remain inactive. Thus the individual's sleep will not be disturbed. When next the medication is taken, step 32 can be performed and the cycle restarted.

Figure 5:
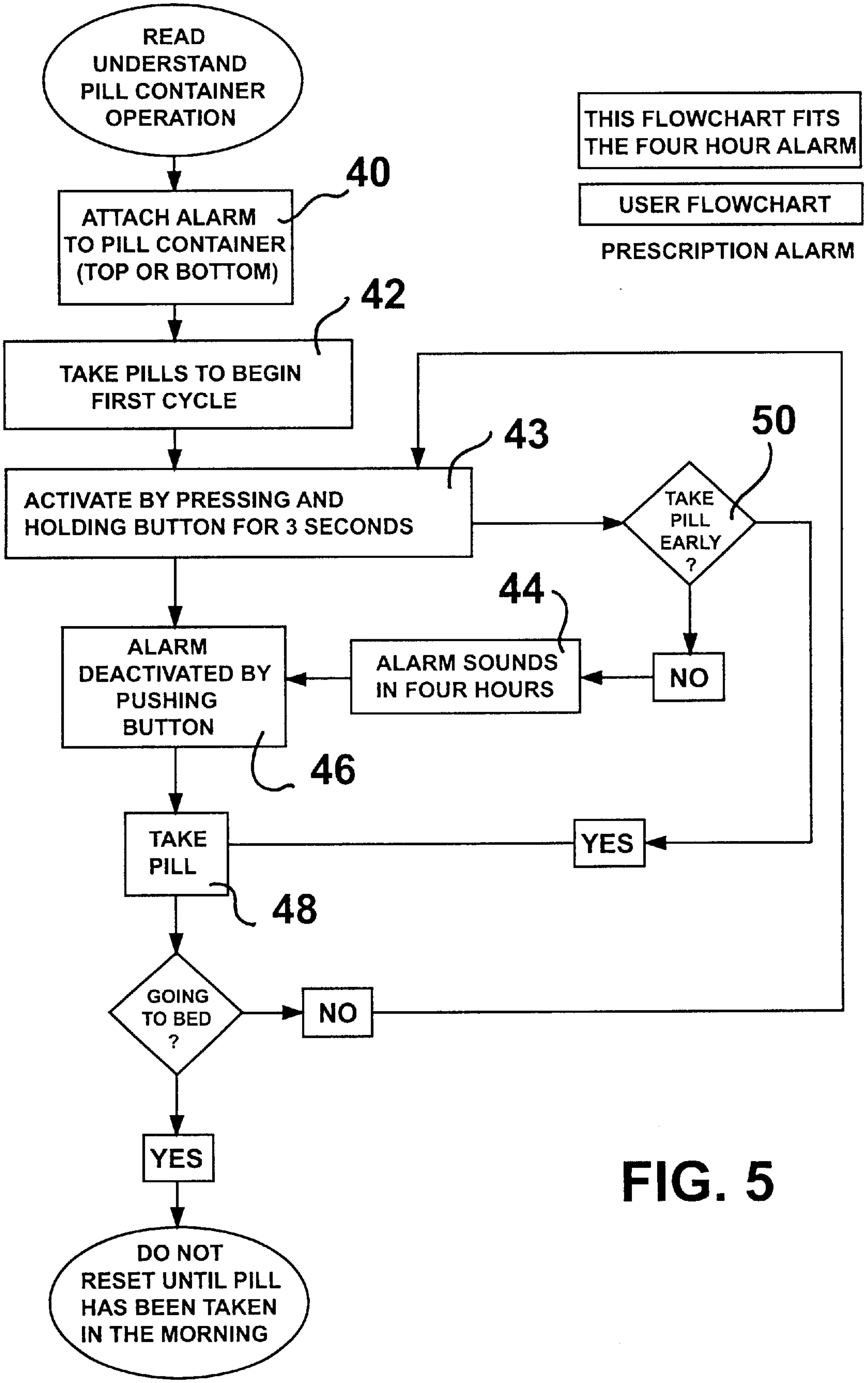
FIG. 5 is a simplified flow diagram of a method of taking medication according to the present invention.

Turning now to FIG. 5, a flow diagram of a method of taking medication, employing device 10 is illustrated. The initial step is an attaching step 40 wherein protective sheet 25 is removed and device 10 is attached to cover 12 or the bottom of container 14. The individual begins the cycle with a medication step 42 wherein the individual takes the medication. In an activation step 43, an individual depresses top 22 for a given period of time, such as three seconds, to start the timer. After the desired time interval, an alarm is activated 44. This signal can be visual, audio, etc., and is three beeps in this embodiment. At this point, in a deactivation step 46, the individual can depress top 22 to stop the signal. The individual then knows to take the medication in a medication step 48 and reset device 10 by returning to step 43 and beginning the cycle again. Alternatively, if the individual takes the medication early 50, device 10 can be reset by going back to step 43. If it is a special occasion such as bedtime and medication is not required throughout the night, device 10 can remain inactive. Thus the individual's sleep will not be disturbed. When next the medication is taken, step 32 can be performed and the cycle restarted.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A medication timing device comprising:

a base having a first surface and an opposing second surface;

a circuit carried by the base and including a timing device, a switch for activating the timing device, a signal device activated by the timing device, and a battery coupled to the timing device and the signal device;

a top coupled to the first surface of the base and covering the circuit, the top moveable between a normal expanded position and a compressed position in which the switch is tripped; and fastening means for fastening the base to a medication container.

2. A medication timing device as claimed in claim 1 wherein the timing device times a single unchangeable interval of time, the timing device actuating the signal device at the termination of the interval of time.

3. A medication timing device as claimed in claim 2 wherein the timing device is reset by tripping the switch.

4. A medication timing device as claimed in claim 3 wherein the circuit includes a delay requiring the switch to be tripped for a set period before activating the timing device.

5. A medication timing device as claimed in claim 4 wherein the switch is tripped to turn off the signal device.

6. A medication timing device as claimed in claim 1 wherein the fastening means includes a layer of adhesive carried by the second surface of the base.

7. A medication timing device as claimed in claim 6 wherein the fastening means further includes a removable protective sheet covering the adhesive layer prior to use.

8. A medication timing device comprising:

a container having a body and a cover couplable to the body;

a base having a first surface and an opposing second surface;

a circuit carried by the base and including a timing device, a switch for activating the timing device, a signal device activated by the timing device, and a battery coupled to the timing device and the signal device;

a top coupled to the first-surface of the base and covering the circuit, the top moveable between a normal expanded position and a compressed position in which the switch is tripped; and a fastening element fastening the base to the medication container.

9. A medication timing device as claimed in claim 8 wherein the fastening element includes a layer of adhesive carried by the second surface of the base, the adhesive layer fastening the base to one of a top surface of the cover of the container and a bottom surface of the body of the container.

10. A medication timing device as claimed in claim 8 wherein the timing device times a single interval of time, the timing device actuating the signal device at the termination of the interval of time.

11. A medication timing device as claimed in claim 10 wherein the timing device is reset by tripping the switch.

12. A medication timing device as claimed in claim 11 wherein the circuit includes a delay requiring the switch to be tripped for a set period before activating the timing device.

13. A medication timing device as claimed in claim 12 wherein the switch is tripped to turn off the signal device.

14. A method of timing medication dosages comprising the steps of:

providing a container having a body and a cover couplable to the body;

providing a timing device including a base having a first surface and an opposing second surface, a circuit carried by the base and including a timer and a switch for activating the timing device, and a top coupled to the first surface of the base and covering the circuit;

fastening the timing device to one of a top surface of the cover of the container and a bottom surface of the body of the container;

activating the timing device for a single unchangeable interval of time by providing the top being moveable between a normal expanded position and a compressed position in which the switch is activated, and moving the top of the timing device to the compressed position for a period of time; and emitting a signal upon termination of the interval of time.

15. A method as claimed in claim 14 further including a step of turning off the emitted signal by moving the top of the timing device to the compressed position.

16. A method as claimed in claim 15 further including a step of resetting the timing device after turning off the signal device.

17. A method as claimed in claim 16 wherein the step of resetting the timing device includes moving the top of the timing device to the compressed position for a period of time.

18. A method as claimed in claim 14 wherein the step of fastening the timing device to one of a top surface of the cover of the container and a bottom surface of the body of the container includes the steps of:

providing a layer of adhesive on the second surface of the base covered by a protective sheet;

removing the protective sheet; and adhering the base to one of the top surface of the cover of the container and the bottom surface of the body of the container.

* * * * *